US008077009B1

(12) United States Patent
Kraft

(10) Patent No.: US 8,077,009 B1
(45) **Date of Patent: *Dec. 13, 2011**

(54) TRINARY TO TRINARY ROLLING CODE GENERATION METHOD AND SYSTEM

(75) Inventor: Clifford H. Kraft, Naperville, IL (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/538,398

(22) Filed: Aug. 10, 2009

Related U.S. Application Data

(63) Continuation of application No. 11/396,964, filed on Apr. 3, 2006, now Pat. No. 7,589,613.

(51) Int. Cl.
*G05B 19/00* (2006.01)

(52) U.S. Cl. ......... 340/5.26; 340/5.1; 340/5.2; 340/5.21

(58) Field of Classification Search .................. 340/5.26
See application file for complete search history.

(56) References Cited

U.S. PATENT DOCUMENTS

| | | | | |
|---|---|---|---|---|
| 4,103,234 | A * | 7/1978 | Frazier, Jr. | 375/360 |
| 4,399,467 | A * | 8/1983 | Subramaniam | 382/244 |
| 4,566,044 | A * | 1/1986 | Langdon et al. | 360/40 |
| 5,841,874 | A * | 11/1998 | Kempke et al. | 713/160 |
| 6,292,107 | B1 * | 9/2001 | Yamaura et al. | 340/825.69 |
| 7,239,257 | B1 * | 7/2007 | Alexander et al. | 341/138 |
| 7,412,056 | B2 | 8/2008 | Farris et al. | |
| 2004/0066936 | A1 | 4/2004 | Farris | |
| 2004/0075466 | A1 * | 4/2004 | Soral | 326/59 |
| 2004/0085937 | A1 * | 5/2004 | Noda | 370/335 |
| 2004/0143766 | A1 * | 7/2004 | Fitzgibbon et al. | 713/202 |
| 2006/0164267 | A1 * | 7/2006 | Fitzgibbon et al. | 341/51 |
| 2007/0236328 | A1 | 10/2007 | Kraft | |

* cited by examiner

*Primary Examiner* — Benjamin C Lee
*Assistant Examiner* — Curtis King
(74) *Attorney, Agent, or Firm* — Brooks Kushman P.C.

(57) ABSTRACT

An all-trinary rolling code method and system which allow a barrier opener to generate and transmit trinary rolling codes without entering or storing any rolling code values as binary words includes obtaining a stored trinary counter value upon a transmitter being actuated to remotely control a barrier. A trinary function void of trinary to binary or binary to trinary conversions is used to transform the trinary counter value to a trinary rolling code output such that the trinary rolling code output represents a trinary value that would be produced if the trinary counter value were converted to binary, mirrored, had its highest ordered bit set to zero after being mirrored, and converted back to trinary. The trinary rolling code output is combined with a stored trinary transmitter identification value to generate a trinary word. The transmitter transmits the trinary word for receipt by a receiver associated with the barrier.

4 Claims, 7 Drawing Sheets

114 112 110

| | TRINARY POWER OF 2 | INVERTED COLUMN |
|---|---|---|
| $2^{31}$ | 12112122212110202102 | 1 |
| $2^{30}$ | 2202211102201212201 | 2 |
| $2^{29}$ | 1101102012212102212 | 11 |
| $2^{28}$ | 200201002221012221 | 22 |
| $2^{27}$ | 100100112222002222 | 121 |
| $2^{26}$ | 11200021111001111 | 1012 |
| $2^{25}$ | 2100010202000202 | 2101 |
| $2^{24}$ | 1011120101000101 | 11202 |
| $2^{23}$ | 120210012000012 | 100111 |
| $2^{22}$ | 21220002111121 | 200222 |
| $2^{21}$ | 10221112202022 | 1101221 |
| $2^{20}$ | 1222021101011 | 2210212 |
| $2^{19}$ | 222122012002 | 12121201 |
| $2^{18}$ | 111022121001 | 102020102 |
| $2^{17}$ | 20122210112 | 211110211 |
| $2^{16}$ | 10022220021 | 1122221122 |
| $2^{15}$ | 1122221122 | 10022220021 |
| $2^{14}$ | 211110211 | 20122210112 |
| $2^{13}$ | 102020102 | 111022121001 |
| $2^{12}$ | 12121201 | 222122012002 |
| $2^{11}$ | 2210212 | 1222021101011 |
| $2^{10}$ | 1101221 | 10221112202022 |
| $2^{9}$ | 200222 | 21220002111121 |
| $2^{8}$ | 100111 | 120210012000012 |
| $2^{7}$ | 11202 | 10111201010000101 |
| $2^{6}$ | 2101 | 2100010202000202 |
| $2^{5}$ | 1012 | 11200021111001111 |
| $2^{4}$ | 121 | 100100112222002222 |
| $2^{3}$ | 22 | 200201002221012221 |
| $2^{2}$ | 11 | 1101102012212102212 |
| $2^{1}$ | 2 | 2202211102201212201 |
| $2^{0}$ | 1 | 12112122212110202102 |

FIG. 7

120

ADDITION (S = X + Y)

| $C_{in}$ | *x* | *y* | $C_{out}$ | *s* |
|---|---|---|---|---|
| 0 | 0 | 0 | 0 | 0 |
| 0 | 0 | 1 | 0 | 1 |
| 0 | 0 | 2 | 0 | 2 |
| 0 | 1 | 0 | 0 | 1 |
| 0 | 1 | 1 | 0 | 2 |
| 0 | 1 | 2 | 1 | 0 |
| 0 | 2 | 0 | 0 | 2 |
| 0 | 2 | 1 | 1 | 0 |
| 0 | 2 | 2 | 1 | 1 |
| 1 | 0 | 0 | 0 | 1 |
| 1 | 0 | 1 | 0 | 2 |
| 1 | 0 | 2 | 1 | 0 |
| 1 | 1 | 0 | 0 | 2 |
| 1 | 1 | 1 | 1 | 0 |
| 1 | 1 | 2 | 1 | 1 |
| 1 | 2 | 0 | 1 | 0 |
| 1 | 2 | 1 | 1 | 1 |
| 1 | 2 | 2 | 1 | 2 |

FIG. 8a

130

ADDITION (D = X - Y)

| $b_{in}$ | *x* | *y* | $b_{out}$ | *d* |
|---|---|---|---|---|
| 0 | 0 | 0 | 0 | 0 |
| 0 | 0 | 1 | 1 | 2 |
| 0 | 0 | 2 | 1 | 1 |
| 0 | 1 | 0 | 0 | 1 |
| 0 | 1 | 1 | 0 | 0 |
| 0 | 1 | 2 | 1 | 2 |
| 0 | 2 | 0 | 0 | 2 |
| 0 | 2 | 1 | 0 | 1 |
| 0 | 2 | 2 | 0 | 0 |
| 1 | 0 | 0 | 1 | 2 |
| 1 | 0 | 1 | 1 | 1 |
| 1 | 0 | 2 | 1 | 0 |
| 1 | 1 | 0 | 0 | 0 |
| 1 | 1 | 1 | 1 | 2 |
| 1 | 1 | 2 | 1 | 1 |
| 1 | 2 | 0 | 0 | 1 |
| 1 | 2 | 1 | 0 | 0 |
| 1 | 2 | 2 | 1 | 2 |

FIG. 8b

140

COMPARISON (X > Y?)

| $same_{in}$ | *x* | *y* | $same_{out}$ | *X > Y?* |
|---|---|---|---|---|
| yes | 0 | 0 | yes | ? |
| yes | 0 | 1 | no | no |
| yes | 0 | 2 | no | no |
| yes | 1 | 0 | no | yes |
| yes | 1 | 1 | yes | ? |
| yes | 1 | 2 | no | no |
| yes | 2 | 0 | no | yes |
| yes | 2 | 1 | no | yes |
| yes | 2 | 2 | yes | ? |
| no | - | - | no | prev. |

FIG. 8c

TRINARY TO TRINARY ROLLING CODE GENERATION METHOD AND SYSTEM

CROSS-REFERENCE TO RELATED APPLICATIONS

This is a continuation of U.S. application Ser. No. 11/396,964, filed Apr. 3, 2006, now U.S. Pat. No. 7,589,613, which is hereby incorporated by reference in its entirety.

BACKGROUND OF THE INVENTION

1. Field of the Invention

The present invention generally relates to rolling code signals.

2. Background Art

A barrier opener system such as a garage door opener ("GDO") system includes a remote transmitter and a receiver. The transmitter may be handheld or mounted within a vehicle. The receiver is typically located within the garage. The transmitter wirelessly transmits signals upon being actuated by a user. The receiver is operable with the garage door to open or close the garage door upon wirelessly receiving an appropriate signal from the transmitter.

The transmitter may code the transmitted signals using a rolling code transmission technique such that each signal transmitted from the transmitter is different than the signal previously transmitted from the transmitter. The signals are different in that each signal contains a different counter value. The counter value changes (i.e., "rolls") for each signal transmitted by the transmitter. The receiver is operable to keep current with the counter value changes. As such, generally a signal that is an appropriate signal during a given transmission from the transmitter will not be an appropriate signal in the future. In general, rolling code transmission techniques are employed to prevent an unauthorized user from gaining access to a garage by recording and re-transmitting a signal previously transmitted by the transmitter.

In typical operation, the transmitter repetitively generates an information signal representing a series of digits whenever a GDO button of the transmitter is pushed by a user. The information signal (i.e., the series of digits) are modulated onto a radio frequency (RF) carrier signal to generate a RF signal for wireless transmission from the transmitter. The type of modulation typically employed is pulse width modulation (PWM). Accordingly, an RF signal transmitted from the transmitter includes a RF carrier signal and an information signal. The series of digits of the information signal are either in a binary (base 2) or a trinary (i.e., "ternary") (base 3) format. In the binary format, the series of digits are represented by a string of zeros and/or ones such as, for example, 00101101001110100 . . . etc. In the trinary format, the series of digits are represented by a string of zeros, ones, and/or twos such as, for example, 010220110201022 . . . etc.

The information signal, which is repeatedly generated for transmission from the transmitter during a given transmission, contains: 1) the serial (identification) number of the transmitter; 2) a button code indicating which GDO button of the transmitter was actuated by the user; and 3) a counter value. The counter value is increased by a predetermined value for each new push of the GDO button (i.e., the counter value is increased by a predetermined value for use with a subsequent signal to be transmitted from the transmitter upon actuation of the GDO button by a user). Part or all of the information signal is usually scrambled or encrypted prior to transmission from the transmitter.

A first rolling code transmission technique uses binary numbers for the information signal. In this first technique, the serial number is not scrambled or encrypted, the button code is encrypted, and the counter value is encrypted. A second rolling code transmission technique uses trinary numbers for the information signal. In this second technique, all three pieces of information are scrambled but not encrypted. The present invention improves upon the scrambled trinary number rolling code transmission technique.

The general operation and features of a typical scrambled trinary number rolling code transmission technique is as follows. Initially, a serial number of the transmitter and a counter value are stored. The serial number is stored as a 20 digit trinary serial number and is fixed. The counter value is stored as a 32 bit binary counter value and changes for each GDO button push. Upon a new GDO button push, this technique performs the following algorithm.

1) add a fixed numerical value such as the numerical value "3" to the 32 bit binary counter value to generate a new 32 bit binary counter value, and store the new 32 bit binary counter value for the next GDO button push;

2) mirror the 32 bit binary counter value bitwise end-to-end;

3) set the highest ordered bit of the mirrored 32 bit binary counter value to zero;

4) convert the numerical value of the mirrored 32 bit binary counter value to a 20 digit trinary counter value;

5) encode the 20 digit trinary serial number using a scrambling algorithm based on the 20 digit trinary counter value;

6) successively interleave the trinary digits of the scrambled 20 digit trinary serial number and the 20 digit trinary counter value to thereby generate a 40 digit trinary word;

7) transmit, from the transmitter, the 40 digit trinary word by pulse width modulating a RF carrier signal with the 40 digit trinary word;

8) receive, by the receiver, the 40 digit trinary word;

9) obtain from the 40 digit trinary word the 20 digit trinary serial number and the 20 digit trinary counter value; and 10) convert the numerical value of the 20 digit trinary counter value into binary form to obtain the 32 bit binary counter value.

A disadvantage of this rolling code transmission technique is the binary to trinary conversion at the transmitter (step #4) and the trinary to binary conversion at the receiver (step #10). Such conversions between binary and trinary numbers are computationally intensive because they require divisions or multiple subtractions.

SUMMARY OF THE INVENTION

Accordingly, it is an object of the present invention to provide an all-trinary rolling code generation method and system that does not employ any binary/trinary or trinary/binary conversions.

In carrying out the above object and other objects, the present invention provides a method which includes obtaining a trinary counter value stored in a transmitter upon the transmitter being actuated to remotely control a barrier. A trinary function void of any trinary to binary conversions or any binary to trinary conversions is then used to transform the trinary counter value to a trinary rolling code output such that the trinary rolling code output represents a trinary value that would be produced if the trinary counter value were converted to binary, mirrored, had its highest ordered bit set to zero after being mirrored, and converted back to trinary. The trinary rolling code output is then combined with a trinary identification value, which identifies the transmitter and is stored in the transmitter, to generate a trinary word. The trinary word is then transmitted from the transmitter for receipt by a receiver associated with the barrier.

In carrying out the above object and other objects, the present invention provides a system which includes a transmitter, a user activation input, a memory for storing a trinary counter value and a trinary identification value which identifies the transmitter, and a processor in communication with the user activation input and the memory. The processor (a) retrieves the trinary counter value from the memory based on receiving a signal from the user activation input; (b) transforms the trinary counter value to a trinary rolling code output by performing a sequence of trinary operations void of any trinary to binary conversions or any binary to trinary conversions on the trinary counter value; (c) interleaves the trinary rolling code output and the trinary identification value to generate a trinary word; and (d) transmits the trinary word using the transmitter for receipt by a receiver.

In carrying out the above object and other objects, the present invention provides a remote control system for remotely controlling a garage door responsive to a radio frequency (RF) signal modulated by a trinary rolling code output. The remote control includes an oscillator for generating a RF carrier signal, a modulator for modulating the RF carrier signal with a modulation signal, a user activation input, a memory for storing a previous trinary counter value, and control logic in communication with the modulator, the user activation input, and the memory. The control logic in response to receiving an activation signal from the user activation input: (a) retrieves the previous trinary counter value from the memory; (b) adds, in trinary, a fixed value to the previous trinary counter value to produce a new trinary counter value; (c) stores a copy of the new trinary counter value as the previous trinary counter value in the memory; (d) performs, in trinary, a binary mirror operation, on the new trinary counter to produce a trinary rolling code output; (e) generates the modulation signal based on the trinary rolling code output; and (f) transmits the RF signal to control the garage door.

In general, the present invention provides an all-trinary rolling code generation method and system for barrier openers such as garage door openers. The method and system of the present invention generate an encoded trinary rolling code by: retrieving an existing trinary counter value from memory; adding a fixed value to the existing trinary counter value to generate a new trinary counter value; storing the new trinary counter value in memory; performing a binary transformation on the trinary counter value using a trinary function to perform the binary transformation (the trinary function produces a trinary rolling code output); and transmitting the trinary rolling code output from a transmitter to a receiver in order to control the closing and opening of the garage door.

An embodiment of the present invention uses a digital signal processor for transforming the new trinary counter value by being operative to: initialize the trinary rolling code to zero; initialize an index to N−1 (where N is an integer); compare the new trinary counter value to 2 taken to the (index) power; if the new trinary counter value is not less than 2 taken to the (index) power, subtract in trinary the 2 taken to the (index) power from the new trinary counter value and add in trinary the 2 taken to the (N-index-1) power to the trinary rolling code; decrement the index; and repeat the steps until the index is zero.

The above features, other features, and advantages of the present invention are readily apparent from the following detailed descriptions thereof when taken in connection with the accompanying drawings.

BRIEF DESCRIPTION OF THE DRAWINGS

FIG. 7 illustrates a trinary table lookup useable with the table-driven operation illustrated in FIG. 6;

FIGS. 8A, 8B, and 8C respectively illustrate a trinary addition table with carries, a trinary subtraction table with borrows, and a trinary comparison table.

DETAILED DESCRIPTION OF THE PREFERRED EMBODIMENT(S)

The present invention provides an all-trinary rolling code generation method and system which allow a remote transmitter to communicate with a receiver in order to open or close a barrier such as a garage door.

Figure 1:
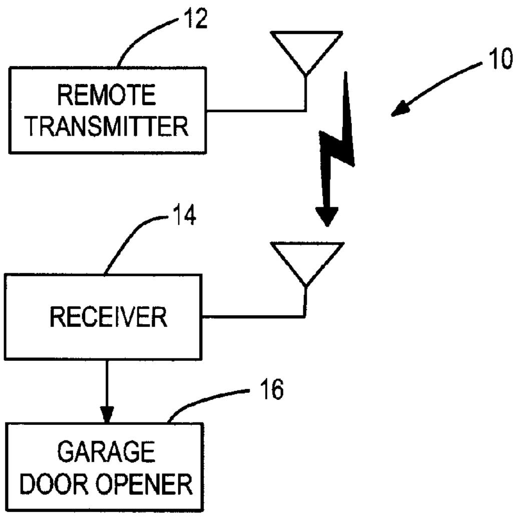
FIG. 1 illustrates a block diagram of a garage door opening (GDO) system in accordance with the present invention.

Referring now to FIG. 1, a garage door opener (GDO) system 10 in accordance with the present invention is shown. GDO system 10 includes a remote transmitter 12, a receiver 14, and a GDO mechanism 16. Transmitter 12 is either a handheld unit or a unit which is integrated into a vehicle. Receiver 14 is typically located within a garage having a garage door. GDO mechanism 16 is operable to open or close the garage door. In operation, transmitter 12 transmits RF signals upon being actuated by a user. Each RF signal includes an RF carrier signal and an information signal. Each information signal includes a different (i.e., rolling) counter value. Receiver 14 communicates with GDO mechanism 16 to open or close the garage door upon receiving a signal containing the correct counter value (i.e., the correct rolling code). As such, if transmitter 12 transmits an RF signal containing the correct counter value to receiver 14, then the receiver communicates with GDO mechanism 16 to open or close the garage door, depending upon a door function command contained in the signal.

Figure 2:
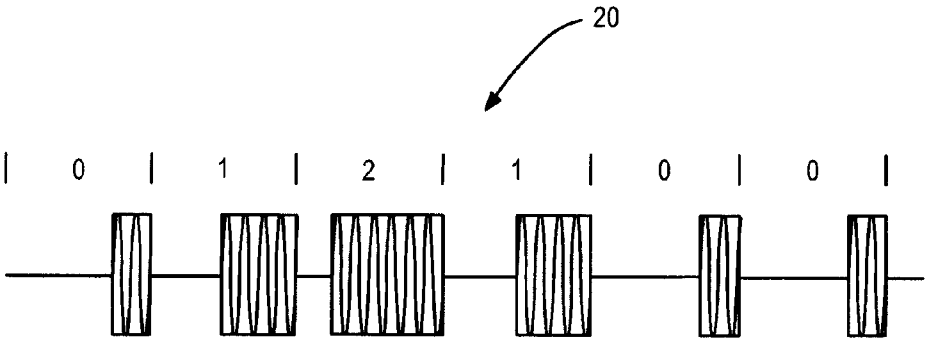
FIG. 2 illustrates pulse-width modulation of a trinary-based information signal onto a radio-frequency (RF) carrier signal for generating a RF signal in accordance with the present invention.

Referring now to FIG. 2, a timing diagram of an RF signal 20 transmitted by transmitter 12 in accordance with the present invention is shown. As indicated above, RF signal 20 includes an RF carrier signal and an information signal. In accordance with the present invention, the information signal is a trinary-based signal comprised of a sequence of the digits 0, 1, and/or 2. The timing diagram of RF signal 20 illustrates the RF carrier signal as being pulse-width modulated with the information signal. As shown, RF signal 20 includes off-on bursts (pulses) of RF energy which represent the 0, 1, and/or 2 digits, or can represent any equivalent set of three digits or codes.

Pulse-width modulation (PWM) represents a particular way of coding the RF energy. As shown in FIG. 2, the width of a particular pulse in time represents the value (0, 1, or 2) of the pulse. Each pulse normally starts at a particular time point (the time points are represented by the vertical lines of FIG. 2). The delay from a time point to the beginning of a pulse representing the value 0 is relatively longest (i.e., the width of this pulse is relatively shortest); the delay from a time point to the beginning of a pulse representing the value 1 is relatively longer (i.e., the width of this pulse is relatively longer); and the delay from a time point to the beginning of a pulse representing the value 2 is relatively shortest (i.e., the width of this pulse is relatively longest). For example, a particular PWM modulation method may use a delay of 1.5 mS for a pulse representing the value 0; a delay of 1.0 mS for a pulse representing the value 1; and a delay of 0.5 mS for a pulse representing the value 2. Any delay or pulse width is in the scope of the present invention. The frequency of the RF carrier signal comprising each pulse can be chosen to be in the GDO band allowed by the federal government or can be any RF frequency. A particular choice of the frequency of the RF carrier signal can be between 300 and 400 MHz.

As noted, RF signal 20 includes an RF carrier signal and an information signal. The information signal includes a trinary serial (identification) number of transmitter 12 and a trinary counter value. Both the trinary serial number and the trinary counter value are scrambled prior to transmission from transmitter 12.

Figure 3:
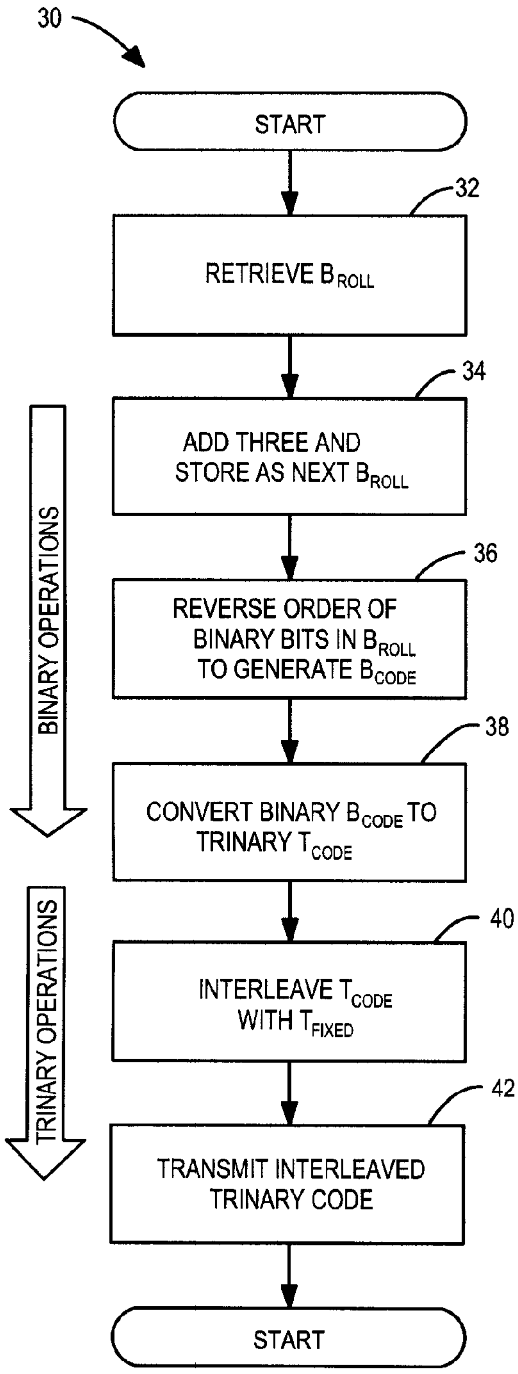
(Background Art) FIG. 3
FIG. 3 illustrates a flowchart describing operation for generating and transmitting a trinary word having a trinary counter value in accordance with a typical scrambled trinary number rolling code transmission technique of the background art.

Referring now to FIG. 3, a flowchart 30 describing operation for generating and transmitting a trinary word having a trinary counter value in accordance with a typical scrambled trinary number rolling code transmission technique is shown. This technique is used to generate and transmit a trinary word upon a GDO button of a remote transmitter being pushed by a user indicating the user's desire to open or close the garage door. Initially, in this technique, the serial number of the transmitter is stored as a 20 digit trinary serial number ($T_{FIXED}$) which is fixed for each GDO button push; and the counter value is stored as a 32 bit binary counter value ($B_{ROLL}$) which changes for each GDO button push.

In operation, the 32 bit binary counter value ($B_{ROLL}$) is retrieved from storage as shown in block 32 upon a GDO button of the transmitter being actuated by a user. A fixed numerical value such as the value of "three" is added to the 32 bit binary counter value ($B_{ROLL}$) to generate the next 32 bit binary counter value ($B_{ROLL}$) which is then stored for use during the next GDO button push as shown in block 34. The 32 bit binary counter value ($B_{ROLL}$) is then mirrored bitwise from left to right (low order bit becomes high order bit, etc.) such that the binary bits of the 32 bit binary counter value ($B_{ROLL}$) are reversed as shown in block 36. In block 36, the highest ordered bit of the mirrored 32 bit binary counter value ($B_{ROLL}$) is set to zero to thereby generate a mirrored 32 bit binary counter value ($B_{CODE}$) which has its highest ordered bit set to zero. The mirrored 32 bit binary counter value ($B_{CODE}$) is then converted to a 20 digit trinary counter value ($T_{coDE}$) as shown in block 38. The trinary digits of the 20 digit trinary counter value ($T_{CODE}$) are successively interleaved with the trinary digits of the 20 digit trinary serial number ($T_{FIXED}$) as shown in block 40 to thereby generate a 40 digit trinary word (i.e., a 40 digit interleaved trinary code). The transmitter transmits the 40 digit trinary word as shown in block 42 for receipt by a GDO receiver. The receiver obtains the 20 digit trinary serial number ($T_{FIXED}$) and the 20 digit trinary counter value ($T_{CODE}$) from the received 40 digit trinary word (not shown). The receiver then converts the 20 digit trinary counter value ($T_{CODE}$) into binary form to obtain the 32 bit binary counter value ($B_{ROLL}$) (not shown).

Figure 4:
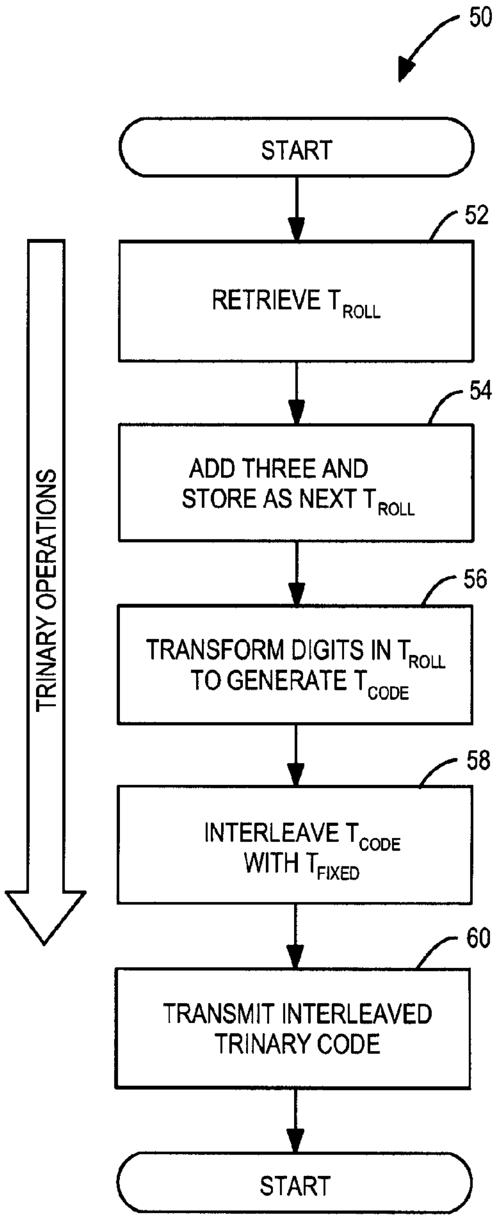
FIG. 4 illustrates a flowchart describing operation for generating and transmitting a trinary word having a trinary counter value in accordance with the present invention.

Referring now to FIG. 4, a flowchart 50 describing operation for generating and transmitting a trinary word having a trinary counter value in accordance with the present invention is shown. The trinary word is generated and transmitted in accordance with the operation of the present invention upon a GDO button of transmitter 12 being pushed by a user indicating the user's desire to open or close the garage door. Initially, in the operation of the present invention, the serial number of transmitter 12 is stored in memory of the transmitter as a 20 digit trinary serial number ($T_{FIXED}$) which is fixed for each GDO button push; and the counter value is stored in the memory as a 20 digit trinary counter value ($T_{ROLL}$) which changes for each GDO button push. For example, a typical 20 digit trinary counter value ($T_{ROLL}$) might be 00000201221012221012.

In operation, the 20 digit trinary counter value ($T_{ROLL}$) is retrieved from the memory of transmitter 12 as shown in block 52 upon a GDO button of the transmitter being actuated by a user. The 20 digit trinary counter value ($T_{ROLL}$) is incremented by a fixed numerical value such as the value of "three" to generate the next 20 digit trinary counter value ($T_{ROLL}$) which is then stored for use during the next GDO button push as shown in block 54. Although this particular implementation uses the incrementation value of three, any other incrementation value is within the scope of the present invention. The number "3" is represented in a 20 digit trinary word as "00000000000000000010". As such, in this example, the next 20 digit trinary counter value ($T_{ROLL}$) is 00000201221012221022, which is the summation of the 20 digit trinary counter value ($T_{ROLL}$) and the incrementation value of three (i.e., is the summation of 00000201221012221012 ($T_{ROLL}$) and 00000000000000000010 (the value of three)).

The 20 digit trinary counter value ($T_{ROLL}$) is then transformed totally in trinary to generate the 20 digit trinary counter value ($T_{CODE}$) as shown in block 56. That is, in block 56, the 20 digit trinary counter value ($T_{ROLL}$) is transformed, entirely in trinary, to produce the same value (i.e., the 20 digit trinary counter value ($T_{CODE}$)) that is produced if the 20 digit trinary counter value ($T_{ROLL}$) is converted to binary, mirrored, had its highest ordered bit set to zero after being mirrored, and converted back to trinary. As such, the operation of the present invention transforms the 20 digit trinary counter value ($T_{ROLL}$) to the 20 digit trinary counter value ($T_{CODE}$) without employing any binary/trinary or trinary/binary conversions and without storing/using any binary counter values as done in the background art operation described with respect to FIG. 3.

The trinary digits of the 20 digit trinary counter value ($T_{CODE}$) are successively interleaved with the trinary digits of the 20 digit trinary serial number ($T_{FIXED}$) as shown in block 58 to thereby generate a 40 digit trinary word (i.e., a 40 digit interleaved trinary code). Transmitter 12 transmits the 40 digit trinary word as shown in block 60 for receipt by receiver 14. More particularly, transmitter 12 transmits an RF signal which includes an RF carrier signal pulse-width modulated by the 40 digit trinary word. After receiving the RF signal, receiver 14 obtains the digit trinary serial number ($T_{FIXED}$)

and the 20 digit trinary counter value ($T_{CODE}$) from the 40 digit trinary word (not shown). Receiver 14 then obtains the 20 digit trinary counter value ($T_{ROLL}$) from the 20 digit trinary counter value ($T_{CODE}$). Again, just like the operational steps handled at transmitter 12, the operational steps handled at receiver 14 do not employ any binary/trinary or trinary/binary conversions.

Accordingly, as described above with reference to block 56 of FIG. 4, the present invention performs an equivalent binary mirroring operation on a trinary counter value without converting the trinary counter value to its binary counter value, mirroring the binary counter value, and then converting the mirrored binary counter back to its trinary counter value. Likewise, the present invention performs the equivalent binary mirroring operation on the trinary counter value without storing a binary counter value, mirroring the binary counter value, and the converting the mirrored binary counter value to trinary as done in the background art operation described with respect to FIG. 3.

Figure 5:
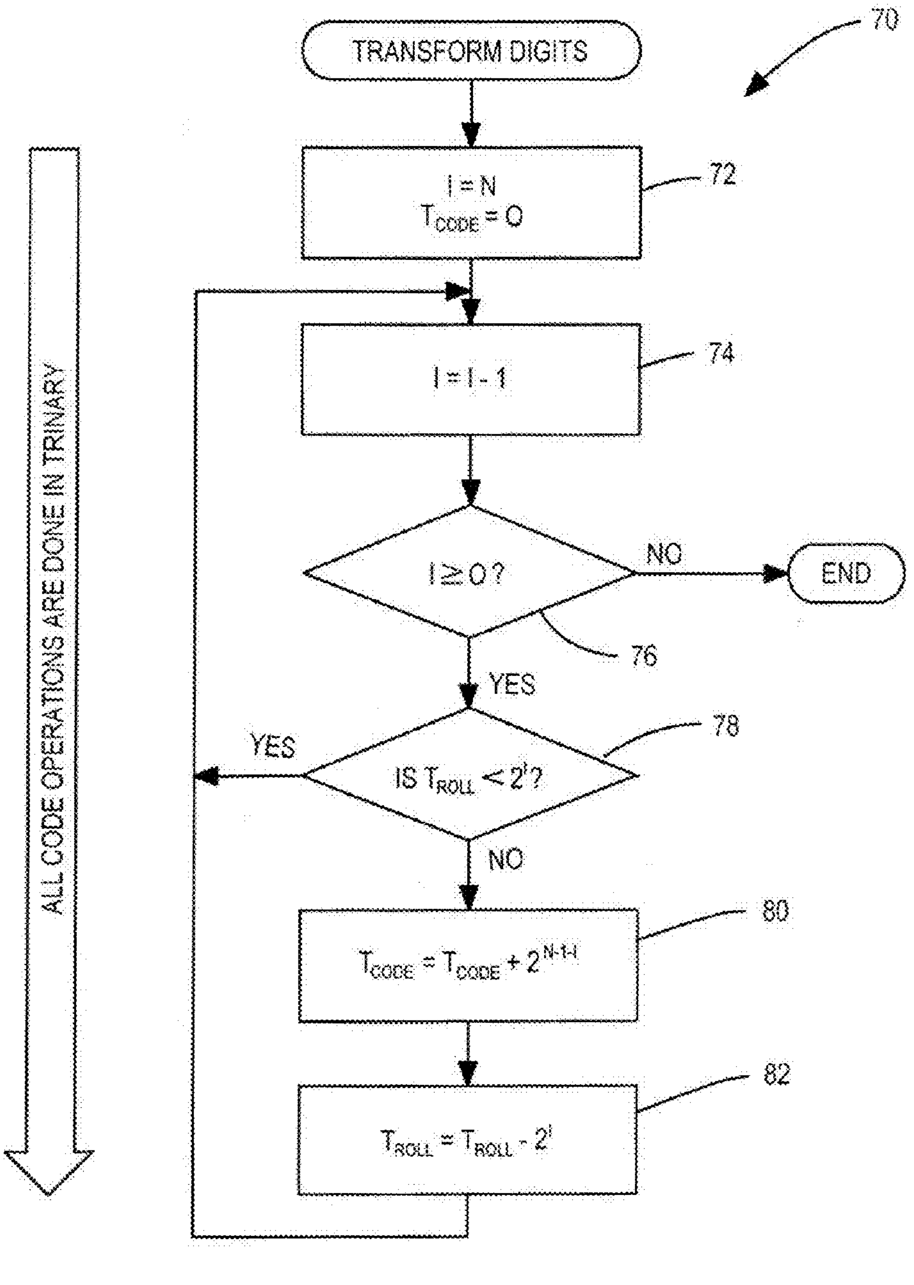
FIG. 5 illustrates a flowchart describing operation for performing, entirely in trinary, an equivalent binary mirror operation on a trinary counter value in accordance with the present invention.

Referring now to FIG. 5, with continual reference to FIG. 4 and the related description regarding block 56 of FIG. 4, a flowchart 70 describing operation for performing, entirely in trinary, an equivalent binary mirror operation on a trinary counter value ($T_{ROLL}$) in accordance with the present invention is shown. In general, the operation includes using a working variable ($T_{CODE}$) to transform an N digit trinary counter value ($T_{ROLL}$) to its mirrored N digit trinary counter value, where N is an integer. N=20 in this embodiment, however, any other N is within the scope of the present invention.

The operation of transforming the N digit trinary counter value ($T_{ROLL}$) to its mirrored N digit trinary counter value as set forth in flowchart 70 exploits the principle that each binary bit (i.e., binary digit) of a binary number represents a power of 2. An entire binary word is represented by a sum of powers of 2. In a sum of powers of 2, a "1" bit means that a power of 2 is present and a "0" bit means that a power of 2 is absent.

In a binary mirroring operation of a binary word represented by a sum of powers of 2, a mirrored binary word is created in which the sum of powers of 2 are reversed. For example, in a 32 bit binary word, the lowest ordered bit represents 2ˆ0 and the highest ordered bit represents 2ˆ31. If the 2ˆ0 bit is present (i.e., has a 1 value or equivalently has a coefficient of 1 in the sum of powers) before mirroring, then the value 2ˆ31 is present in the sum of powers after mirroring. Because the bits are mirrored around a center point in the sum of powers, each bit position on one side of the center point has a complementary bit position on the other side of the center point with the bit positions being located the same distance from the center point. Each bit's complementary position represents a different power of 2. More particularly, for the bit position represented by the power of 2ˆn the complementary bit position is represented by the power 2ˆ(N-n-1), where N is the length of the binary word. The length N of a binary word used in GDO systems is typically 32. As such, for example, 2ˆ1 (the second bit from lowest order) has a complement 2ˆ30; 2ˆ0 has the complementary position 2ˆ31; etc. The location of the reflection point depends on the length N of the binary word.

As such, all that is necessary in order to perform a binary mirroring operation on a trinary word, completely in trinary, is to determine which powers of 2 (represented by trinary values) are present in the un-mirrored trinary word and then create a sum of the trinary values representing the complementary powers of 2 (again, totally in trinary representation). The operation of the present invention makes use of the noted power determination and sum creation steps in order to transform the N digit trinary counter value (($T_{ROLL}$) to its mirrored N digit trinary counter value as set forth in block 56 of FIG. 4 and flowchart 70 of FIG. 5.

Flowchart 70 illustrated in FIG. 5 represents an algorithm for performing, entirely in trinary, a binary mirroring operation on a N digit trinary counter value ($T_{ROLL}$) having an arbitrary length N (such as N=32). The algorithm repeats from I=N to I=0 with I being decremented on each iteration. The working variable ($T_{CODE}$) is initially is set to zero. In general, the working variable ($T_{CODE}$) increasingly changes as the algorithm moves through the iterations with the final value of the working variable ($T_{CODE}$) representing, in trinary, the binary mirrored value of the N digit trinary counter value ($T_{ROLL}$) as initially stored in memory.

The algorithm begins by initializing I and the working variable ($T_{CODE}$) such that I=N and $T_{CODE}$=0 as shown in block 72. The first iteration then begins by decrementing I by 1 to generate a current value of I as shown in block 74. The current value of I is then checked to determine whether it is greater than 0 as shown in decision block 76. If yes (meaning that all iterations have not yet been performed), then decision block 78 determines whether 2ˆI (I being the current value of I) is greater than the current value of the N digit trinary counter value ($T_{ROLL}$). If decision block 78 returns a yes, then the current value of I is decremented by 1 as shown by block 74 and the loop continues for the next iteration. If decision block 78 returns a no, then 2ˆ(N--b 1-I) is added to the working variable ($T_{CODE}$) as shown in block 80 and 2ˆI is subtracted from the N digit trinary counter value ($T_{ROLL}$) as shown in block 82. This process is performed for each iteration until the loop completes at I=0. Upon completion of the loop, the working variable $T_{CODE}$ represents, in trinary, the binary mirrored value of the N digit trinary counter value ($T_{ROLL}$).

Figure 6:
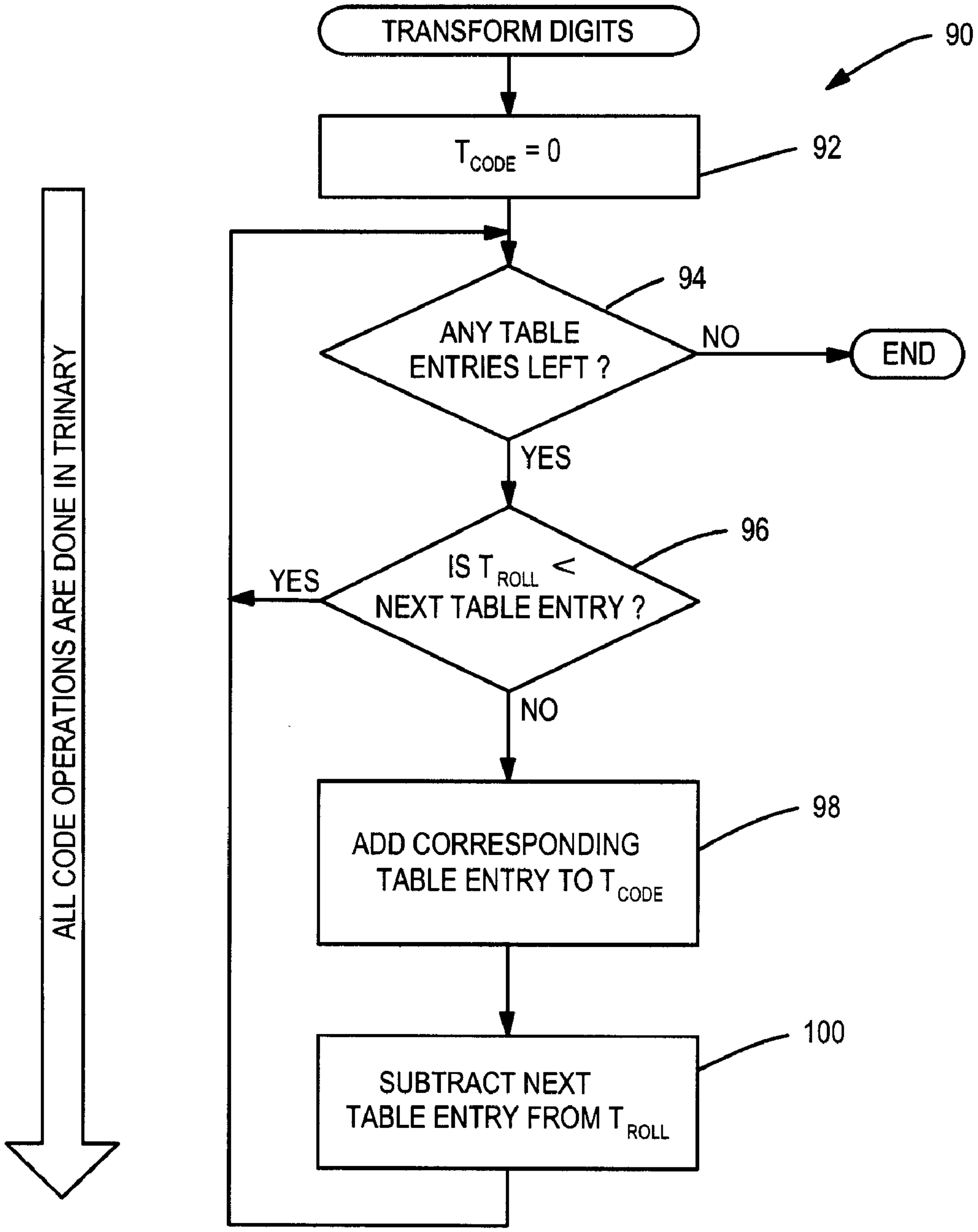
FIG. 6 illustrates a flowchart describing table-driven operation for performing, entirely in trinary, an equivalent binary mirror operation on a trinary counter value in accordance with the present invention.

Referring now to FIG. 6, with continual reference to FIG. 5, a flowchart 90 describing table-driven operation for performing, entirely in trinary, an equivalent binary mirror operation on a N digit trinary counter value ($T_{ROLL}$) in accordance with the present invention is shown. That is, flowchart 90 represents performing the same algorithm of FIG. 5 using a trinary table lookup.

Referring now to FIG. 7, with continual reference to FIGS. 5 and 6, a trinary table lookup 110 useable with the table-driven operation illustrated by flowchart 90 of FIG. 6 is shown. Trinary table lookup 110 includes a right-hand column ("inverted column") 112 and a left-hand ("trinary power of 2") column 114. Trinary table lookup 110 includes 32 rows (i.e., N=32) where the rows of right-hand column 114 contain ascending powers of 2 in trinary and the rows of left-hand column 112 contain descending powers of 2 in trinary.

The algorithm set forth by flowchart 90 of FIG. 6 begins by setting the working variable ($T_{CODE}$) to zero as shown in block 92. The algorithm starts at the top row (i.e., 2ˆ31) of trinary table lookup 110 and iterates through each table row one at a time until reaching the last table row (i.e., 2ˆ0) of the trinary table lookup. As such, upon each iteration, the algorithm decides whether any table rows are left to be analyzed as shown by decision block 94. If yes (meaning that all rows have not yet been analyzed), then the algorithm determines whether the current value of the N digit trinary counter value ($T_{ROLL}$) is less than the entry of the left-hand column 114 of trinary table lookup 110 for the current row as shown by decision block 96 (e.g., see block 78 of FIG. 4 "Is $T_{ROLL}$<2ˆI"). If yes, then the algorithm iterates through to the next row and repeats the process starting at block 94. If no, then the entry of right-hand column 112 of trinary table lookup 110 for the current row is added (using trinary addition) to the working variable ($T_{CODE}$) as shown in block 98 and the entry of left-hand column 114 of the trinary table lookup for the current row is subtracted (using trinary subtraction) from the current value of the N digit trinary counter value ($T_{ROLL}$) as shown in block 100. This process repeats for each iteration until the last row has been analyzed. As such, when the bottom row (i.e., 2ˆ0) of trinary table lookup 110 has been reached, the transformation of the N digit trinary counter value ($T_{ROLL}$) to its binary mirrored value is complete. That is upon completion of the algorithm of FIG. 6, the working variable $T_{CODE}$ represents in trinary the binary mirrored value of the N digit trinary counter value ($T_{ROLL}$) as initially stored by transmitter 12.

As described above with respect to FIG. 3, the background art operation sets the highest ordered bit of a mirrored binary counter value to zero. The equivalent operation in the trinary algorithm described with respect to FIG. 6 is to simply not perform the last step (simply not look at the last row of trinary table lookup 110). That way, the value of 2ˆ(N−1) (i.e., 2ˆ31 in the case of N=32) is never entered. This is equivalent in trinary to setting the highest binary bit to zero in a binary representation.

As described above, the execution of the table-driven algorithm of FIG. 6 using trinary table lookup 110 of FIG. 7 requires trinary addition, comparison, and subtraction. FIG. 8A illustrates a trinary addition table 120 with carry-in and carry-out. FIG. 8B illustrates a trinary subtraction table 130 with borrow-in and borrow-out. FIG. 8C illustrates a trinary comparison table 140. Just like tables 120 and 130, comparison table 140 is used digit by digit from the lowest order trinary digit (3ˆ0) to the highest order trinary digit in a trinary word. The value same-in and same-out is propagated like a carry or borrow.

Figure 9:
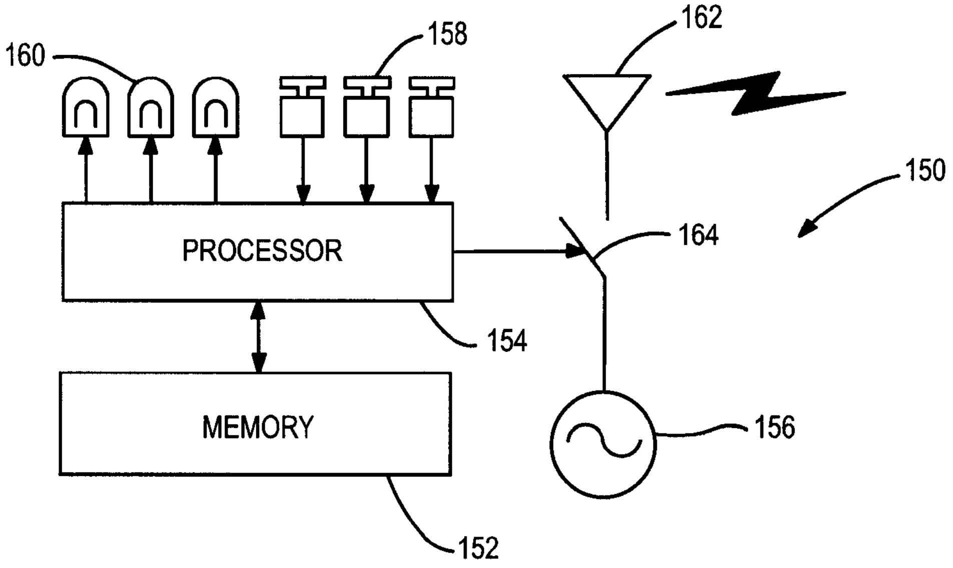
FIG. 9 illustrates a block diagram of an embodiment of a remote transmitter in accordance with the present invention.

Referring now to FIG. 9, a block diagram of an embodiment of a remote transmitter 150 of a GDO system in accordance with the present invention is shown. Transmitter 12 includes a memory 152, a processor 154, an RF oscillator 156, push buttons 158, and light of LED displays 160. Processor 154 computes and generates the rolling code in trinary as described above upon a user actuating an appropriate push button 158. This trinary rolling code along with a trinary serial number is transmitted from an antenna 162 of transmitter 150 using PWM RF transmission by pulsing the output of oscillator 156 with a switch 164 (RF switching circuit). Memory 152 is used with processor 154 to store the entries of trinary table lookup (or any similar tables) as well as temporary values and values such as working variable $T_{CODE}$ and trinary counter value $T_{ROLL}$. Memory 152 can also be used to store executable computer programs that perform the algorithms and functions provided by the present invention.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A system comprising:

a transmitter;

a user activation input;

a memory for storing a trinary rolling counter value and a trinary identification value, wherein the trinary identification value identifies the transmitter, wherein the trinary rolling counter value has N digits;

the memory for further storing a table of two columns and N rows, each row of the table representing a value of I from 0 to N−1, the first column containing trinary values of 2ˆI and the second column containing trinary values of 2ˆ(N-I-1);

a processor in communication with the user activation input and the memory, wherein the processor:

(a) retrieves the trinary rolling counter value from the memory based on receiving a signal from the user activation input;

(b) transforms the trinary rolling counter value to a trinary code output by performing a sequence of trinary operations void of any trinary to binary conversions or any binary to trinary conversions on the trinary rolling counter value, the sequence of trinary operations including iterating through each table row one at a time for I=N−1 to 0 and for each iteration, if the trinary rolling counter value is less than the trinary value of the first column of the Ith table row, adding the trinary value of the first column of the Ith table row to the trinary code output and subtracting the trinary value of the second column of the Ith table row from the trinary rolling counter value;

(c) interleaves the trinary code output and the trinary identification value to generate a trinary word; and (d) transmits the trinary word using the transmitter for receipt by a receiver.

2. The system of claim 1 wherein:

the processor further (e) adds a fixed value to the trinary rolling counter value to generate a new trinary rolling counter value; and (f) stores the new trinary rolling counter value in the memory for the new trinary rolling counter value to be retrieved by the processor upon the processor receiving a subsequent signal from the user activation input.

3. The system of claim 1 wherein:

the transmitter comprises an oscillator generating a radio frequency (RF) carrier signal, and a modulator in communication with the processor, wherein the modulator modulates the RF carrier with the trinary word.

4. The system of claim 1 wherein:

the modulator is a pulse width modulator.

* * * * *